US009602338B2

(12) United States Patent
Zhang et al.

(10) Patent No.: US 9,602,338 B2
(45) Date of Patent: Mar. 21, 2017

(54) SYSTEM AND METHOD FOR NETWORK PACKET EVENT CHARACTERIZATION AND ANALYSIS

(71) Applicant: NEC Laboratories America, Inc., Princeton, NJ (US)

(72) Inventors: Hui Zhang, Princeton Junction, NJ (US); Junghwan Rhee, Princeton, NJ (US); Nipun Arora, Plainsboro, NJ (US); Cristian Lumezanu, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 196 days.

(21) Appl. No.: 14/575,013

(22) Filed: Dec. 18, 2014

(65) Prior Publication Data
US 2015/0180755 A1 Jun. 25, 2015

Related U.S. Application Data

(60) Provisional application No. 61/918,957, filed on Dec. 20, 2013.

(51) Int. Cl.
*H04L 12/26* (2006.01)
*H04L 12/24* (2006.01)

(52) U.S. Cl.
CPC ........ *H04L 41/0631* (2013.01); *H04L 41/069* (2013.01); *H04L 41/14* (2013.01); *H04L 43/0858* (2013.01)

(58) Field of Classification Search
CPC ....... H04J 3/14; H04Q 11/0478; H04Q 11/04; H04L 43/50; H04L 12/2697
See application file for complete search history.

(56) References Cited

U.S. PATENT DOCUMENTS

| | | | | |
|---|---|---|---|---|
| 7,369,556 | B1* | 5/2008 | Rekhter | H04L 12/465 370/392 |
| 2004/0057389 | A1* | 3/2004 | Klotz | H04L 41/12 370/252 |
| 2007/0147271 | A1* | 6/2007 | Nandy | H04L 41/0896 370/254 |
| 2008/0155342 | A1* | 6/2008 | O'Callahan | G06F 11/3636 714/38.14 |
| 2008/0155537 | A1* | 6/2008 | Dinda | G06F 9/4887 718/1 |
| 2009/0248611 | A1* | 10/2009 | Xu | G06F 9/45533 |
| 2010/0074125 | A1* | 3/2010 | Chandra | H04L 12/2602 370/252 |

(Continued)

*Primary Examiner* — Maharishi Khirodhar
*Assistant Examiner* — Sanjay K Dewan
(74) *Attorney, Agent, or Firm* — Joseph Kolodka

(57) ABSTRACT

A computer implemented method for network monitoring includes providing network packet event characterization and analysis for network monitoring that includes supporting summarization and characterization of network packet traces collected across multiple processing elements of different types in a virtual network, including a trace slicing to organize individual packet events into path-based trace slices, a trace characterization to extract at least 2 types of feature matrix describing those trace slices, and a trace analysis to cluster, rank and query packet traces based on metrics of the feature matrix.

20 Claims, 6 Drawing Sheets

(56) References Cited

U.S. PATENT DOCUMENTS

| | | | | |
|---|---|---|---|---|
| 2011/0125892 A1* | 5/2011 | Rajan | ........................ | H04L 43/10 |
| | | | | 709/224 |
| 2011/0320878 A1* | 12/2011 | Rosu | ..................... | G06F 11/302 |
| | | | | 714/38.1 |
| 2013/0151485 A1* | 6/2013 | Kim | ..................... | G06F 11/3476 |
| | | | | 707/693 |
| 2013/0151685 A1* | 6/2013 | Bursell | ................... | H04L 45/66 |
| | | | | 709/223 |
| 2013/0298184 A1* | 11/2013 | Ermagan | ................. | G06F 21/54 |
| | | | | 726/1 |
| 2014/0301213 A1* | 10/2014 | Khanal | ................... | H04L 43/12 |
| | | | | 370/248 |
| 2015/0370799 A1* | 12/2015 | Kushmerick | ...... | G06F 17/30598 |
| | | | | 707/740 |
| 2016/0173338 A1* | 6/2016 | Wolting | ................ | H04L 41/145 |
| | | | | 709/223 |

* cited by examiner

```
2013/08/26,09:14:28.99999,0xcba,3,IN,000000001000200000100040500032000000401f964c0a8
0004c0a800020001001001e0000000000000000000000000000000000,6dcd0000ac1000fde000
0001
```

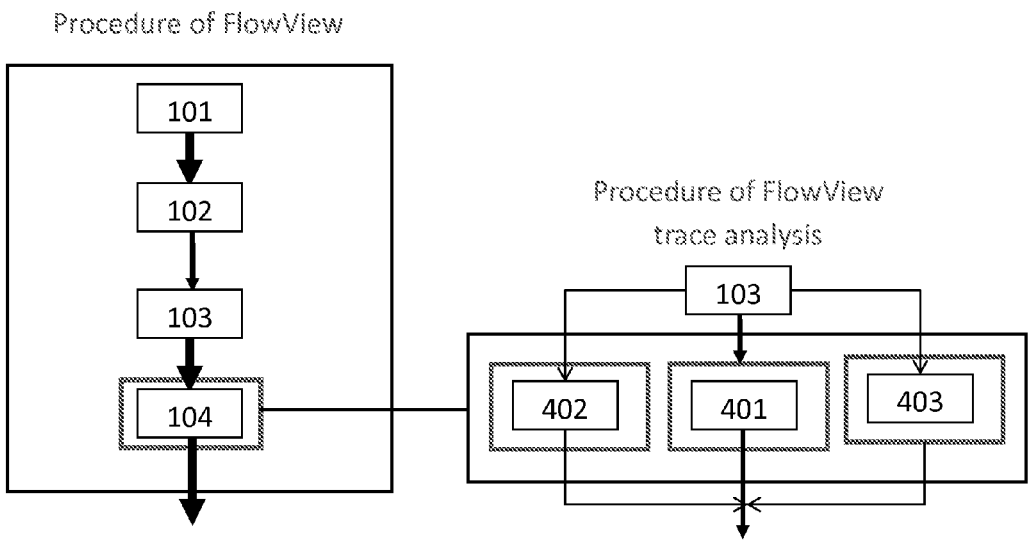

Fig. 5

```
Ranking scheme : Latency (milliseconds)

mean        3620.712325
variance    128895585.985413
std         11353.219190

46726.734161 192.168.101.2-192.168.101.3/trace16.txt, Packet UID: 7
--- very high (mean + 2*std) : 26327.150706
--- high      (mean +   std) : 14973.931515
9202.588081 192.168.101.2-192.168.101.3/trace15.txt, Packet UID: 6
--- normal    (mean         ) : 3620.712325
2001.745939 192.168.101.2-192.168.101.3/trace2.txt, Packet UID: 9
   0.124931 192.168.101.2-192.168.101.3/trace4.txt, Packet UID: 11
   0.059128 192.168.101.2-192.168.101.3/trace9.txt, Packet UID: 15
   0.030041 192.168.101.2-192.168.101.3/trace14.txt, Packet UID: 5
   0.021935 192.168.101.2-192.168.101.3/trace17.txt, Packet UID: 8
   0.021935 192.168.101.2-192.168.101.3/trace7.txt, Packet UID: 13
   0.018835 192.168.101.2-192.168.101.3/trace1.txt, Packet UID: 0
   0.018120 192.168.101.2-192.168.101.3/trace5.txt, Packet UID: 12
   0.013113 192.168.101.2-192.168.101.3/trace11.txt, Packet UID: 2
   0.008106 192.168.101.2-192.168.101.3/trace8.txt, Packet UID: 14
   0.005960 192.168.101.2-192.168.101.3/trace13.txt, Packet UID: 4
   0.004053 192.168.101.2-192.168.101.3/trace3.txt, Packet UID: 10
   0.002861 192.168.101.2-192.168.101.3/trace12.txt, Packet UID: 3
   0.000000 192.168.101.2-192.168.101.3/trace10.txt, Packet UID: 1
```

Fig. 6

```
Ranking scheme : Number of Links (hops)

mean     1.687500
variance 0.214844
std      0.463512

2.000000 192.168.101.2-192.168.101.3/trace1.txt,  Packet UID: 0
   2.000000 192.168.101.2-192.168.101.3/trace11.txt, Packet UID: 2
   2.000000 192.168.101.2-192.168.101.3/trace14.txt, Packet UID: 5
   2.000000 192.168.101.2-192.168.101.3/trace16.txt, Packet UID: 7
   2.000000 192.168.101.2-192.168.101.3/trace17.txt, Packet UID: 8
   2.000000 192.168.101.2-192.168.101.3/trace2.txt,  Packet UID: 9
   2.000000 192.168.101.2-192.168.101.3/trace4.txt,  Packet UID: 11
   2.000000 192.168.101.2-192.168.101.3/trace5.txt,  Packet UID: 12
   2.000000 192.168.101.2-192.168.101.3/trace7.txt,  Packet UID: 13
   2.000000 192.168.101.2-192.168.101.3/trace8.txt,  Packet UID: 14
   2.000000 192.168.101.2-192.168.101.3/trace9.txt,  Packet UID: 15
--- normal     (mean        ) : 1.687500
   1.000000 192.168.101.2-192.168.101.3/trace10.txt, Packet UID: 1
   1.000000 192.168.101.2-192.168.101.3/trace12.txt, Packet UID: 3
   1.000000 192.168.101.2-192.168.101.3/trace13.txt, Packet UID: 4
   1.000000 192.168.101.2-192.168.101.3/trace15.txt, Packet UID: 6
   1.000000 192.168.101.2-192.168.101.3/trace3.txt,  Packet UID: 10
```

Fig. 7

```
Ranking scheme : Packet Size (bytes)

mean     175.500000
variance 13953.750000
std      118.125992

328.000000 192.168.101.2-192.168.101.3/trace10.txt, Packet UID: 1
 328.000000 192.168.101.2-192.168.101.3/trace12.txt, Packet UID: 3
 328.000000 192.168.101.2-192.168.101.3/trace13.txt, Packet UID: 4
 328.000000 192.168.101.2-192.168.101.3/trace15.txt, Packet UID: 6
 328.000000 192.168.101.2-192.168.101.3/trace3.txt,  Packet UID: 10
 328.000000 192.168.101.2-192.168.101.3/trace8.txt,  Packet UID: 14
--- high       (mean +   std) : 293.625992
--- normal     (mean        ) : 175.500000
  84.000000 192.168.101.2-192.168.101.3/trace1.txt,  Packet UID: 0
  84.000000 192.168.101.2-192.168.101.3/trace11.txt, Packet UID: 2
  84.000000 192.168.101.2-192.168.101.3/trace14.txt, Packet UID: 5
  84.000000 192.168.101.2-192.168.101.3/trace16.txt, Packet UID: 7
  84.000000 192.168.101.2-192.168.101.3/trace17.txt, Packet UID: 8
  84.000000 192.168.101.2-192.168.101.3/trace2.txt,  Packet UID: 9
  84.000000 192.168.101.2-192.168.101.3/trace4.txt,  Packet UID: 11
  84.000000 192.168.101.2-192.168.101.3/trace5.txt,  Packet UID: 12
  84.000000 192.168.101.2-192.168.101.3/trace7.txt,  Packet UID: 13
  84.000000 192.168.101.2-192.168.101.3/trace9.txt,  Packet UID: 15
```

Fig. 8

```
command 1  : latency <= value1 (number: milliseconds)
             e.g., 1 20
command 2  : latency >= value1 (number: milliseconds)
command 3  : latency <  value1 (number: milliseconds)
command 4  : latency >  value1 (number: milliseconds)
command 5  : latency == value1 (number: milliseconds)
command 6  : match all, value1 = *
command 7  : start time <= value1 (yr/month/day,hr:min:sec.xx,)
             e.g., 7 2013/07/23,10:49:05.280351,
command 8  : start time >= value1 (yr/month/day,hr:min:sec.xx,)
command 9  : end time <= value1 (yr/month/day,hr:min:sec.xx,)
command 10: end time >= value1 (yr/month/day,hr:min:sec.xx,)
command 11: src ip          == value1 (numbers : decimal)
             e.g., 11 192.168.101.2
command 12: src ip prefix   == value1 (numbers : decimal)
             e.g., 12 192.0.0.0
command 13: dst ip          == value1 (numbers : decimal)
             e.g., 13 192.168.101.3
command 14: dst ip prefix   == value1 (numbers : decimal)
             e.g., 14 192.0.0.0
```

Fig. 9

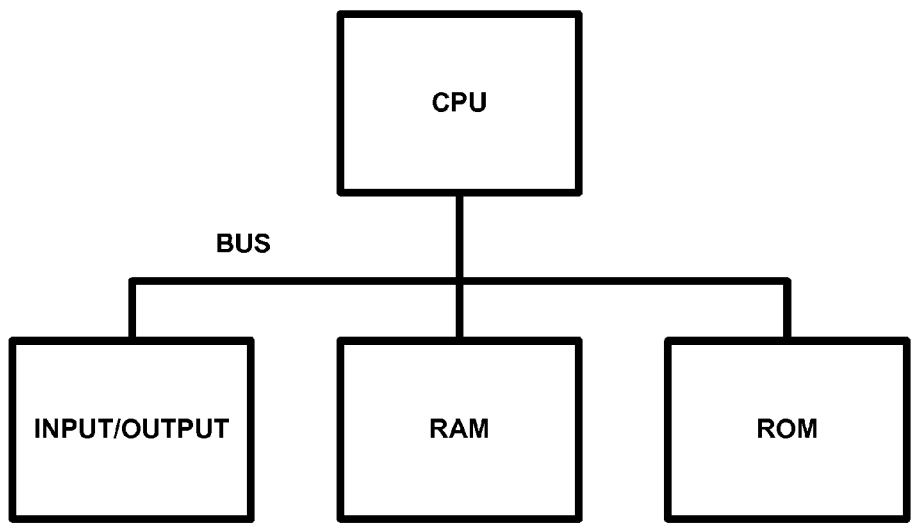

Fig. 11

```
--- Query result ---
Packet 192.168.101.2-192.168.101.3/trace1.txt , Packet UID: 0 Duration 0.018835 ms  IP SRC 192.168.101.2 IP DST 192.168.101.3
Packet 192.168.101.2-192.168.101.3/trace10.txt, Packet UID: 1 Duration 0.000000 ms  IP SRC 192.168.101.2 IP DST 192.168.101.3
Packet 192.168.101.2-192.168.101.3/trace11.txt, Packet UID: 2 Duration 0.013113 ms  IP SRC 192.168.101.2 IP DST 192.168.101.3
Packet 192.168.101.2-192.168.101.3/trace12.txt, Packet UID: 3 Duration 0.002861 ms  IP SRC 192.168.101.2 IP DST 192.168.101.3
Packet 192.168.101.2-192.168.101.3/trace13.txt, Packet UID: 4 Duration 0.005960 ms  IP SRC 192.168.101.2 IP DST 192.168.101.3
Packet 192.168.101.2-192.168.101.3/trace14.txt, Packet UID: 5 Duration 0.030041 ms  IP SRC 192.168.101.2 IP DST 192.168.101.3
Packet 192.168.101.2-192.168.101.3/trace17.txt, Packet UID: 8 Duration 0.021935 ms  IP SRC 192.168.101.2 IP DST 192.168.101.3
Packet 192.168.101.2-192.168.101.3/trace3.txt , Packet UID: 10 Duration 0.004053 ms IP SRC 192.168.101.2 IP DST 192.168.101.3
Packet 192.168.101.2-192.168.101.3/trace4.txt , Packet UID: 11 Duration 0.124931 ms IP SRC 192.168.101.2 IP DST 192.168.101.3
Packet 192.168.101.2-192.168.101.3/trace5.txt , Packet UID: 12 Duration 0.018120 ms IP SRC 192.168.101.2 IP DST 192.168.101.3
Packet 192.168.101.2-192.168.101.3/trace7.txt , Packet UID: 13 Duration 0.021935 ms IP SRC 192.168.101.2 IP DST 192.168.101.3
Packet 192.168.101.2-192.168.101.3/trace8.txt , Packet UID: 14 Duration 0.008106 ms IP SRC 192.168.101.2 IP DST 192.168.101.3
Packet 192.168.101.2-192.168.101.3/trace9.txt , Packet UID: 15 Duration 0.059128 ms IP SRC 192.168.101.2 IP DST 192.168.101.3
```

SYSTEM AND METHOD FOR NETWORK PACKET EVENT CHARACTERIZATION AND ANALYSIS

RELATED APPLICATION INFORMATION

This application claims priority to provisional application No. 61/918,957 filed Dec. 20, 2013, entitled "System and Method for Network Packet Event Characterization and Analysis", the contents thereof are incorporated herein by reference

BACKGROUND OF THE INVENTION

The present invention relates generally to software system performance diagnosis, and more particularly, to network packet event characterization and analysis.

Network virtualization has been propounded as a diversifying attribute of the future inter-networking paradigm. By introducing a plurality of heterogeneous network architectures cohabiting on a shared physical substrate, network virtualization promotes innovations and diversified applications. As one of the core network virtualization technology, Open vSwitch (OVS) [1] is a production quality, multilayer virtual switch. It is designed to enable massive network automation through programmatic extension, while still supporting standard management interfaces and protocols (e.g. NetFlow, sFlow, SPAN, RSPAN, CLI, LACP, 802.1ag). It can operate both as a soft switch running within the hypervisor, and as the control stack for switching silicon. It has been ported to multiple virtualization platforms and switching chipsets.

However, when moving to this new distributed environment, there better be a way to have clear visibility and understanding of how the network is performing. When issues arise, it is essential to have the diagnostic and troubleshooting capability to solve them before any business impact to any tenant.

The traditional abstractions and mechanisms for monitoring the network are often somewhat fragmented. There are centralized software applications that monitor network elements using interfaces such as netflow and simple network management protocol SNMP. However, these mechanisms can suffer from inconsistent implementations across equipment and often do not expose information at the right granularity or abstraction.

Accordingly, there is a need for a solution for network packet event characterization and analysis that is not taught hereto before.

BRIEF SUMMARY OF THE INVENTION

The invention is directed to a computer implemented method for network monitoring that includes providing network packet event characterization and analysis for network monitoring that comprises supporting summarization and characterization of network packet traces collected across multiple processing elements of different types in a virtual network, and providing an aggregate view of what is happening with the virtual network, wherein the providing includes a trace slicing to organize individual packet events into path-based trace slices, a trace characterization to extract at least 2 types of feature matrix describing those trace slices, and a trace analysis to cluster, rank and query packet traces based on metrics of the feature matrix, and wherein the network packet trace summarization and characterization for network monitoring enables diagnosing data-path routing problems in the network and enables new network visualization and traffic analysis.

In a similar aspect of the invention, there is provided a non-transitory storage medium with instructions to enable a computer implemented method for network monitoring that includes providing network packet event characterization and analysis for network monitoring that comprises supporting summarization and characterization of network packet traces collected across multiple processing elements of different types in a virtual network, and providing an aggregate view of what is happening with the virtual network; wherein the providing includes a trace slicing to organize individual packet events into path-based trace slices, a trace characterization to extract at least 2 types of feature matrix describing those trace slices, and a trace analysis to cluster, rank and query packet traces based on metrics of the feature matrix; and wherein the network packet trace summarization and characterization for network monitoring enables diagnosing data-path routing problems in the network and enables new network visualization and traffic analysis.

These and other advantages of the invention will be apparent to those of ordinary skill in the art by reference to the following detailed description and the accompanying drawings.

BRIEF DESCRIPTION OF THE DRAWINGS

FIG. 5 is a diagram of a FlowView trace analysis, in accordance with the invention.

FIG. 6 shows a ranking example with end-to-end packet latency.

FIG. 7 shows a ranking with the number of links in a trace slice.

FIG. 8 shows a ranking with the packet size.

FIG. 9 shows examples of query conditions.

FIG. 10 shows a set of packet traces reported by the query function.

FIG. 11 is a diagram of an exemplary computer for carrying out the invention.

DETAILED DESCRIPTION

The present invention is directed to a method to support the summarization and characterization of network packet traces such as Open vSwitch OVS traces collected across multiple processing elements of different types, and provide an aggregate view of what's happening with Virtual Networks. It includes a trace slicing scheme to organize individual packet events into path-based trace slices. It also includes a slice characterization scheme to extract two types of feature matrix describing those trace slices, and a set of trace analysis algorithms to cluster, rank, and query packet traces based on those feature metrics.

Figures 1, 2, 4:
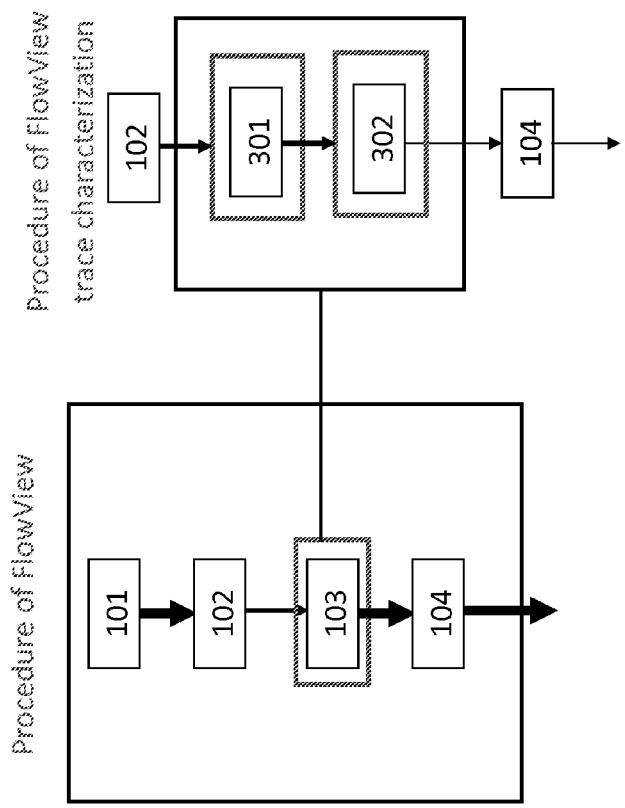
FIG. 1 is a diagram of a FlowView packet trace analysis, in accordance with the invention.
FIG. 2 shows an example of a FlowView packet event.
FIG. 4 is a diagram of a FlowView trace characterization, in accordance with the invention.

FIG. 1 shows the process of the invention—FlowView packet trace summarization and analysis. The flow chart is explained in details as follows:

Block 101 represents packet trace collection. This step collects the network packet traces from the target network. Such packet event traces can be obtained from OVSes or physic network elements such as switches or routers, with open-source libpcap based packet capture tools or any proprietary packet dump tools. A packet event e is defined as a 5-tuple object [time $T_e$, switch ID $SW_e$, switch port $Port_e$, IN/OUT, packet header $H_e$, payload $P_e$], where time $T_e$ is the time when the event e was recorded; switch ID $SW_e$, port $Port_e$, and IN/OUT describes at which switch and port the packet e was IN or OUT; the packet header $H_e$ and payload $L_e$ record the network header (Ethernet frame and IP header) and payload of the packet e.

Block 102 represents trace slicing. This step transforms original individual packet events into separate trace slices, and each slice includes all packet events from 101 that a network packet invoked and was recorded when traversing the network.

Block 103 represents trace characterization. This step extracts two types of feature matrix from the trace slices output by 102.

Block 104 represents trace analysis. This step applies a set of data analytic techniques onto the trace slices from 102 based on the feature metrics output by 103.

The features of the invention are in 102 (trace slicing) and 103 (trace characterization). The details of these features are explained below.

Figures 3A, 3B:
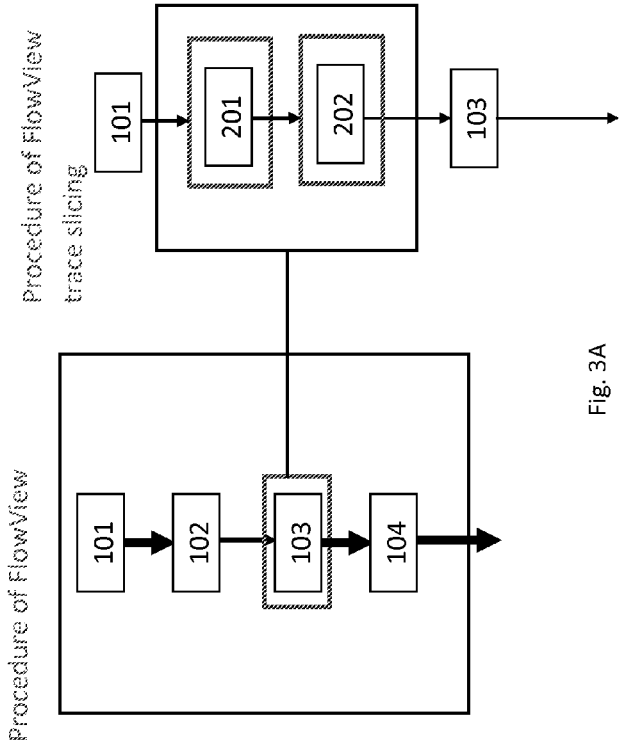
FIG. 3A shows a FlowView trace slicing procedure, in accordance with the invention.
FIG. 3B shows an example of a FlowView trace slice.

FIG. 3 shows the details of the FlowView trace slicing procedure as follows:

Block 201 represents a step to pre-process the collected packet events. Following is the pre-process procedure on all the packet events collected from the target network: Block 201 includes: a) for each packet event e [time $T_e$, switch ID $SW_e$, switch port $Port_e$, IN/OUT, packet header $H_e$, payload $P_e$], a packet signature $S_e$ is created based on the header $H_e$ and payload $P_e$. The signature $S_e$ is the invariant content in the packet associated with event e that does not change through the routing process. In the header $H_e$, the IP flow information [source IP address, source port, destination IP address, destination port] is a part of the invariant content (for IP tunneling, the inner IP header's flow information is invariant). In the payload $P_e$, the whole content or a hash value of the content can be used as a part of the signature. The signature $S_e$ is the combination of the invariant content created from both the header $H_e$ and payload $P_e$. After this step, each packet event e is updated to a 5-tuple object [time $T_e$, switch ID $SW_e$, switch port $Port_e$, IN/OUT, packet header $H_e$, signature $S_e$] where the payload is removed for space saving.

A FlowView packet event example after pre-processing is shown in FIG. 2.

Block 201 includes: b) aggregate all packet events, sort them in an increasing order by the event time stamp $T_e$, and store them into an ordered list data structure M.

Block 202 represents slice packet events. One trace slice (TS) is defined as a time-ordered event sequence data structure <S> that includes all recorded packet events that a network packet invoked when traversing the network.

Following is the slicing algorithm to generate trace slices from the collected packet events in 101 using the packet signatures generated in step 201:

Block 202 includes: a) initialize an empty TS set TSS={ };

202.b—starting from the first packet event e in M until the last one, repeat the following steps:

202.b.1—search in the set TSS for any existing TS having the same signature as e's signature $S_e$. If no TS found, create a new TS, insert e as the first event of this TS and label its signature as $S_e$, and continue; otherwise, go to 202.b.2.

202.b.2—if for every found TS, its last packet event's time stamp is earlier than e's time stamp by more than $T_D$, the maximum time a packet can remain in the network and is a function of the network diameter, then create a new TS, insert e as the first event of this TS and label its signature as $S_e$, and continue; otherwise, go to 202.b.3.

203.b.3—for each found TS whose last packet event's time stamp is not earlier than e's time stamp by more than $T_D$, append e as the last event of this TS.

202.c—return TS set TSS.

A FlowView trace slice example is shown below in FIG. 3. The slice includes three network events for one packet that have traversed through (switch ID 00000ea0aed90542, port 1), (switch ID 000000304890f95d, port 2), and (switch ID 000000304890f95d, port 1).

FIG. 4 shows the details of the FlowView trace characterization procedure as follows:

Block 301 represents trace slice vector generation. Each packet may have a diverse route. In order to precisely analyze each packet's behavior and represent its route, we defined a matrix called a trace slice vector. This procedure presents how to generate a trace slice vector.

Input:

A set of trace slices: $T=\{T_k\}$, k is the index for slices, $|T|=N$, $1 \leq k \leq N$, A trace slice is a time-ordered list of path link nodes. $T_k=\{p_1, \ldots, p_m\}$.

A path node is regarding the information of a router or a switch that the packet passes by. It consists of $p_m=\{$timestamp, switch id, port, IN/OUT, packet header signature$\}$.

Output:

A trace slice has a trace slice vector $v_k$ which is a two dimensional matrix whose row represents a switch id and whose column represents a port (=$v_k$ [switch id] [port]).

---

Algorithm: GeneratePacketPathVector (T)

---

```
// for each trace
for each T_k in T:
    v_k = V[k]
    initialize v_k
    for each path link node p in T_k:
        v_k [p.switch id] [p.port] += 1
    end for
end for
return V
```

Block 302 represents generation of packet features. This component generates a new perspective of trace information to understand its behavior in various aspects. This information is called Packet Features (302). We define the transfer functions to generate packet features from packet trace events in a uniform way. The mapping between the trace events and packet features are diverse. For example, the latency measures the end-to-end time spent in the transmission of a packet. The number of links of a packet expresses how many switches/routers are traversed in the transmission.

Input:

A set of trace slices: T={Tk}, k is the index for trace slices, $|T|=N$, $1 \leq k \leq N$, A set of transfer functions: $F=\{f_l\}$, l is the index of a resource transfer function, $|f|=L$, $1 \leq l \leq L$ Output:
A set of Packet Feature vectors: R ---
Algorithm: GeneratePacketFeatures(T, F)
---
```
R = ∅
// for each trace
    for each T_k in T:
        for each f_l in F:
            R_{k,l} = f_l(T_k)
        end for
    end for
return R
```
---

Here are some examples of transfer functions.

The latency feature is the time between the first and last path link nodes. $f_{latency}(T_k)=|t_N-t_1|$, $e_j \in T_k$, $t_j$ is the time stamp for $e_j$, $1 \leq j \leq N$.

The number of links is simply the number of path link nodes inside a slice.

$f_{numlink}(T_k)=|T_k|$.

Packet size feature is the size of the packet which should be constant across path links. $f_{size}(T_k)=$the size of the packet $T_k$ Block 104 represents packet trace analysis procedure. The Flowview trace analysis procedure is shown in FIG. 5. FlowView provides three types of packet trace analyses: Clustering (401), Ranking (402), and Query (403). These three functions provide versatile packet trace analytics functions.

The trace slice clustering 401 constructs the clusters of trace slices based on the similarity of the paths of packets. This path similarity is determined as the similarity of the switch id and the port pair which are represented as a trace slice vector.

Trace slices are clustered by using the trace slice vectors. For the clustering method, we used connectivity based clustering (also called hierarchical clustering) with a threshold ($Thres_C$) in the distance function. This scheme uses an agglomerative method (bottom-up approach), and the single-linkage (nearest neighbor approach) is used to connect clusters. Here a and b stand for the trace slices. Their trace slice vectors are represented as $v_a$ and $v_b$. A and B are the clusters of traces.

Linkage criteria: $\min\{d(a,b): a \in A, b \in B, d(a,b) \leq Thres_C\}$

The distance function for the comparison of trace slice vectors is based on the Euclidean distance:

$$d(a,b) = \begin{cases} \frac{\|v_a \cup v_b\| - \|v_a \cap v_b\|}{\|v_a \cup v_b\|}, & \|v_a \cup v_b\| > 0 \\ \infty, & \|v_a \cup v_b\| = 0 \end{cases}$$

$$= \begin{cases} \frac{\sum_{i,j}\max(v_a[i][j], v_b[i][j]) - \sum_{i,j}\min(v_a[i][j], v_b[i][j])}{\sum_{i,j}\max(v_a[i][j], v_b[i][j])}, & \|v_a \cup v_b\| > 0 \\ \infty, & \|v_a \cup v_b\| = 0 \end{cases}$$

Each trace pair in the trace set will be compared by applying this distance function on their trace slice vectors and they are connected if their distance is less than the threshold value.

The Packet Ranking 402 provides ranking of packet traces so that users can understand the significance of packet traces in a given ranking scheme of interest.

Depending on users' interest various feature vectors can be used for ranking packets. For instance, we show three examples ranking traces using latency, the number of hops, and the packet size. While traces are ranked by different features, the ranking mechanism is common.

Input:
The ranking feature number: l
Packet feature vector: R
Traces: T
Output:
Print of rank results ---
Algorithm: RankPacketTraces (l, R, T)
---
```
S = ∅
for each k in (1, |T|):
    S.pushback (k, R_{k,l})
end for
Sort S with regard to the packet feature, R_{k,l}
Print S in the ascending order of R_{k,l}
```
---

FIG. 6 shows the packet traces ranked using the latency feature ($R_{k,latency}$).

FIG. 7 shows the packet traces ranked using the number of links ($R_{k,numlink}$).

FIG. 8 shows a ranking example that ranks packet traces using the packet size ($R_{k,size}$).

With Packet Query 403, in case users would like to find packet traces of certain input, query function can achieve such a goal. Given a set of conditions, this procedure queries the set of trace slices and reports the set that matches the query conditions.

FIG. 9 shows examples of query conditions. FIG. 10 shows a set of packet traces reported by the query function.

The query algorithm traverses the packet feature vectors, and if there is any matched item meeting all query conditions, it pushes the matched item in the list. After the traversal, it presents the list of packet traces matched.

Input:
The query number: l
Query conditions: $Q=\{q\}$, query conditions could be connected either "and" or "or".
Packet feature vector: R
Trace slices: T
Output:
Print of query results ---
Algorithm: Query (l, Q, R, T)
---
```
S = ∅
for each k in (1, |T|):
    if R_{k,l} meets the conditions in Q:
        S.pushback (k, R_{k,l})
end for
Print S in the ascending order of R_{k,l}
```
---

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

By way of example, a block diagram of a computer to support the invention is discussed next in FIG. 11. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides monitoring and troubleshooting operational networks can be a daunting task, due to their size, distributed state, and additional complexity introduced by network virtualization. The traffic analytic tool set available to network operator/integrator is limited. The present invention provides a technology of network packet trace summarization and characterization for network monitoring and trouble-shooting. It can help operators/integrators to speed up diagnosing data-path routing problems, and enables new network visualization and traffic analysis. The technology is flexible and has no pre-requisite on network topology information, and can handle packet traces covering either full or partial routing paths.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for network monitoring, the method comprising:
   providing, using a hardware processor, network packet event characterization and analysis for network monitoring that comprises supporting summarization and characterization of network packet traces collected across multiple processing elements of different types in a virtual network; and
   providing an aggregate view of what is happening with the virtual network, wherein the providing includes a trace slicing to organize individual packet events into path-based trace slices, a trace characterization to extract at least 2 types of feature matrix describing those trace slices, and a trace analysis for clustering, ranking and querying packet traces based on metrics of the feature matrix,
   wherein the clustering includes constructing clusters of trace slices based on a similarity of paths of packets, the ranking is based on one or more of a plurality of types of packet feature vectors, and the querying includes traversing all the packet feature vectors to generate a list of items meeting all query conditions; and
   wherein the network packet trace summarization and characterization for network monitoring enables diagnosing data-path routing problems in the network and enables new network visualization and traffic analysis.

2. The method of claim 1, wherein the trace slicing comprises transforming original individual packet events into separate trace slices, each slice including all packet events from a packet trace collection that a network packet invoked and was recorded when traversing the network.

3. The method of claim 1, wherein the trace slicing comprises:
   preprocessing all packet events collected from a target network,
   aggregating all packet events,
   sorting the aggregated packet events in an increasing order by an event time stamp and
   storing the aggregated packet events into an ordered list data structure.

4. The method of claim 3, wherein the trace slicing comprises:
   a preprocessing of all packet events that includes for each packet event (e), a time (Te), a switch identification (ID SWe), a switch port (Porte), an IN/OUT, a packet header (He), and a payload (Pe).

5. The method of claim 4, wherein the preprocessing comprises creating a packet signature (Se) based on the header (He) and payload (Pe),
   the signature (Se) being an invariant content in a packet associated with event (e) that does not change through a routing process,
   in the header (He), the Internet Protocol (IP) flow information [source IP address, source port, destination IP address, destination port] being a part of the invariant content for IP tunneling, an inner IP header's flow information being invariant.

6. The method of claim 4, wherein the preprocessing comprises: that
   in the payload (Pe), a whole content or a hash value of the content can be used as a part of a signature (Se), the signature (Se) being a combination of an invariant content created from both the header (He) and payload (Pe),
   then each packet event (e) is updated to a 5-tuple object of time (Te), switch ID (SWe), switch port (Porte), IN/OUT, packet header (He), and signature (Se) where the payload is removed for space saving.

7. The method of claim 1, wherein the trace slicing comprises:

slicing packet events where one trace slice (TS) is defined as a time-ordered event sequence data structure (<S>) that includes all recorded packet events that a network packet invoked when traversing the network; and generating trace slices from collected packet events using packet signatures.

8. The method of claim 7, wherein the generating of trace slices from collected packet events using packet signature comprises:

initializing an empty trace slice (TS) set (TSS)={ }, starting from a first packet event (e) in an ordered list data structure (M) until the last one, repeating the following steps:

searching in the set TSS for any existing TS having the same signature as e's signature (Se) and if no TS is found, creating a new TS, inserting e as a first event of this TS and labelling its signature as Se, and continuing; otherwise, if for every found TS, its last packet event's time stamp is earlier than e's time stamp by more than Td, a maximum time a packet can remain in the network and is a function of a network diameter, then creating a new TS, insert e as the first event of this TS and labelling its signature as Se, and continuing; otherwise, for each found TS whose last packet event's time stamp is not earlier than e's time stamp by more than Td, appending e as the last event of this TS, and returning the TS set (TSS).

9. The method of claim 1, wherein the trace characterization comprises:

a trace slice vector generation, wherein packet may have a diverse route; and in order to precisely analyze each packet's behavior and represent its route, responsive to a defined matrix called a trace slice vector, the trace slice vector generation presents how to generate a trace slice vector.

10. The method of claim 1, wherein the trace characterization comprises:

a generation of packet features which generates a new perspective of trace information to understand its behavior in various aspects, this information being called packet features and there being a defining of transfer functions to generate packet features from packet trace events in a uniform way, a mapping between the trace events and packet features being diverse.

11. A non-transitory storage medium with instructions to enable a computer implemented method for network monitoring that comprises:

providing, using a hardware processor, network packet event characterization and analysis for network monitoring that comprises supporting summarization and characterization of network packet traces collected across multiple processing elements of different types in a virtual network; and providing an aggregate view of what is happening with the virtual network, wherein the providing includes a trace slicing to organize individual packet events into path-based trace slices, a trace characterization to extract at least 2 types of feature matrix describing those trace slices, and a trace analysis for clustering, ranking, and querying packet traces based on metrics of the feature matrix, wherein the clustering includes constructing clusters of trace slices based on a similarity of paths of packets, the ranking is based on one or more of a plurality of types of packet feature vectors, and the querying includes traversing all the packet feature vectors to generate a list of items meeting all query conditions, and wherein the network packet trace summarization and characterization for network monitoring enables diagnosing data-path routing problems in the network and enables new network visualization and traffic analysis.

12. The non-transitory storage medium of claim 11, wherein the trace slicing comprises:

transforming original individual packet events into separate trace slices, each slice including all packet events from a packet trace collection that a network packet invoked and was recorded when traversing the network.

13. The non-transitory storage medium of claim 11, wherein the trace slicing comprises:

preprocessing all packet events collected from a target network, aggregating all packet events, sorting the aggregated packet events in an increasing order by an event time stamp; and storing the aggregated packet events into an ordered list data structure.

14. The non-transitory storage medium of claim 13, wherein the trace slicing comprises:

a preprocessing of all packet events that includes for each packet event (e) a time (Te), a switch identification (ID SWe), a switch port (Porte), an IN/OUT, a packet header (He), and a payload (Pe).

15. The non-transitory storage medium of claim 14, wherein the preprocessing comprises:

creating a packet signature (Se) based on the header (He) and payload (Pe), the signature (Se) being an invariant content in a packet associated with event (e) that does not change through a routing process, in the header (He), the Internet Protocol (IP) flow information [source IP address, source port, destination IP address, destination port] being a part of the invariant content for IP tunneling, an inner IP header's flow information being invariant.

16. The non-transitory storage medium of claim 14, wherein the preprocessing comprises: that in the payload (Pe), a whole content or a hash value of the content can be used as a part of a signature (Se), the signature (Se) being a combination of an invariant content created from both the header (He) and payload (Pe), then each packet event e is updated to a 5-tuple object of time (Te), switch ID SWe (ID SWe), switch port (Porte), IN/OUT, packet header (He), and signature (Se), where the payload is removed for space saving.

17. The non-transitory storage medium of claim 11, wherein the trace slicing comprises:

slicing packet events where one trace slice (TS) is defined as a time-ordered event sequence data structure (<S>) that includes all recorded packet events that a network packet invoked when traversing the network; and generating trace slices from collected packet events using packet signatures.

18. The non-transitory storage medium of claim 17, wherein the generating of trace slices from collected packet events using packet signatures comprises:

initializing an empty trace slice (TS) set (TSS)={ }, starting from a first packet event (e) in an ordered list data structure (M) until the last one, repeating the following steps:
  searching in the set TSS for any existing TS having the same signature as e's signature (Se) and if no TS is found, creating a new TS, inserting e as a first event of this TS and labelling its signature as Se, and continuing; otherwise,
  if for every found TS, its last packet event's time stamp is earlier than e's time stamp by more than Td, a maximum time a packet can remain in the network and is a function of a network diameter, then creating a new TS, insert e as the first event of this TS and labelling its signature as (Se), and continuing; otherwise,
  for each found TS whose last packet event's time stamp is not earlier than e's time stamp by more than Td, appending e as the last event of this TS, and returning the TS set TSS.

19. The non-transitory storage medium of claim 11, wherein the trace characterization comprises:
  a trace slice vector generation,
  wherein packet may have a diverse route; and
  in order to precisely analyze each packet's behavior and represent its route, responsive to a defined matrix called a trace slice vector, the trace slice vector generation presents how to generate a trace slice vector.

20. The non-transitory storage medium of claim 11, wherein the trace characterization comprises:
  a generation of packet features which generates a new perspective of trace information to understand its behavior in various aspects,
  this information being called packet features and there being a defining of transfer functions to generate packet features from packet trace events in a uniform way,
  a mapping between the trace events and packet features being diverse.

* * * * *